Figure 1:
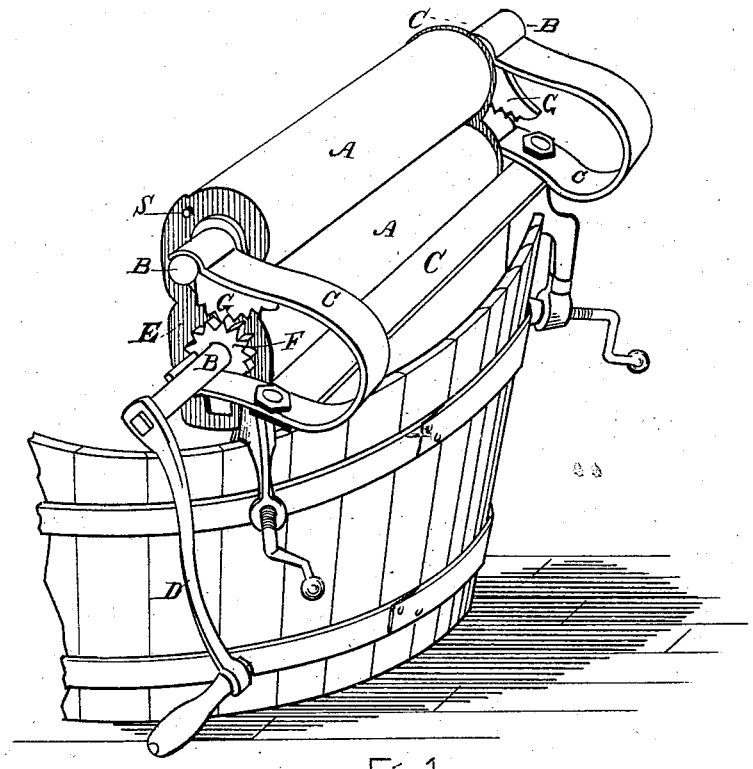

(No Model.)

C. K. STINSON.
CLOTHES WRINGER.

No. 261,639. Patented July 25, 1882.

Witnesses:
A. W. Parsons
C. G. Keyes

Inventor:
Charles K. Stinson
by A. H. Spencer
his Attorney ved that the
UNITED STATES PATENT OFFICE.

CHARLES K. STINSON, OF NEW YORK, N. Y., ASSIGNOR TO CHARLES W. BASSETT, OF NEWTON, MASSACHUSETTS.

CLOTHES-WRINGER.

SPECIFICATION forming part of Letters Patent No. 261,639, dated July 25, 1882.

Application filed November 14, 1881. (No model.)

*To all whom it may concern:*

Be it known that I, CHARLES K. STINSON, a citizen of the United States, residing in New York, in the county and State of New York, have invented certain new and useful Improvements in Clothes-Wringers; and I do hereby declare that the same are fully described in the following specification and illustrated in the accompanying drawings.

The object of this invention is to provide an attachment for wringing-machines, whereby pressure of their elastic rollers upon each other may be relieved, when desired, by a reverse or backward rotation. It is well known that permanent injury to the yielding material of such rollers follows a severe and long-continued pressure of their metallic shafts toward each other, tending to flatten the rubber bodies and force them laterally from or loosen them upon the shafts. This is especially true of such machines as have no thumb-screws or similar means of relaxing the spring-pressure. By my invention this tendency to injury is overcome and the usefulness of the rollers greatly prolonged.

My invention as illustrated in the drawings is embodied in a machine having a pair of rotary elastic rollers forced toward each other by pressure-springs, and provided with a gear-wheel secured to the shaft of one roller and a toothed cam loosely mounted on the other shaft, so as to engage with the gear-wheel when the motion is reversed. As an equivalent device, a comparatively smooth faced disk and cam may be substituted for the gearing, the separation of the rollers being in such case somewhat less speedily accomplished.

Figure 3:
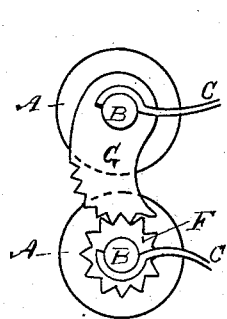
Figure 2:
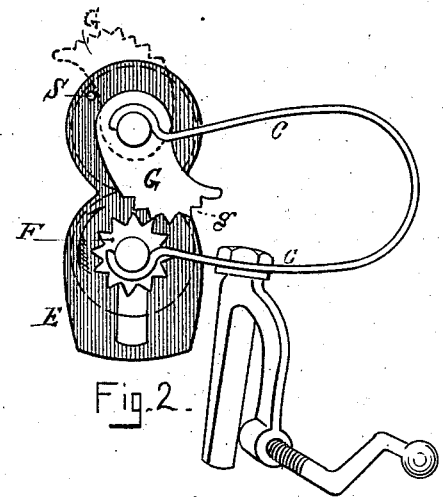

In the drawings, Figure 1 is a perspective view of a machine to which my invention is applied. Fig. 2 is an end view, showing the parts in position for wringing; and Fig. 3 shows the rollers separated by the cam and gear.

A A are the rubber rollers, secured on the shafts B B, and mounted for rotation in bearings of a suitable frame, C C.

D is the crank for applying power, the direction of movement when the wringer is in use being indicated by the arrow.

E is a fender, which may be employed at each end to keep the article out of the gearing and bearings.

The C-frames in the machine shown serve as powerful springs to force the rollers together.

F F are gear-wheels secured on the driving-shaft and rotating with it in either direction. Above these, and loose on the shaft of the upper roller, are cams G G, toothed on their prominent faces along a curved line gradually receding from the axis, about as shown. These cams, in the ordinary use of the machine, may be thrown back against a stop, *s*, on the fender, as shown in dotted lines in Fig. 2, so as to have no contact with the wheel F F; or they may be allowed to drop down of their own weight against said wheels, with which they will not engage during the rotation of the roller in wringing. When, however, the machine becomes clogged or use of it is terminated, a reverse movement of the crank will cause the teeth of the gear-wheel and cam to engage, and a continuance of such movement will force the shafts and rollers apart, since the larger part of the cam is brought between its axis and that of the gear-wheel, as denoted in Fig. 3. The movement is quickly and easily accomplished, because the crank serves as a long lever, affording great power. I shape the cams so as to hold the rollers temporarily out of contact when once so placed—that is, so that they shall not involuntarily come together again. This is accomplished by reducing the curve of the cams at a proper point, as at *g*, to an arc of a circle, or thereabout, so that when this portion is in mesh with the wheel F the pressure of the spring-frames C C does not tend to turn the cam back again, and thus relieve the cam and gear from holding the rollers apart. The cams G may turn loosely on the roller-bearings or on rings slipped thereon, or on hubs formed on the outer faces of the fenders E.

I claim as my invention—

1. In a wringing-machine, the gear F, secured on the driving-shaft, in combination with the cam G, loose on the opposite shaft, adapted to engage with each other when the rollers are turned backward, for the purpose set forth.

2. The combination of the rollers A A, shafts B B, crank D, and suitable supporting and pressure devices with the gears F and toothed loose cams G, substantially as and for the purpose set forth.

3. In a clothes-wringer having elastic rollers pressed forcibly together, the combination, with such rolls and their shafts, of a gear and cam arranged as shown and described, said cam having a portion, $g$, of arc form, whereby when the rolls are separated by the gear and cam they will be held at a fixed distance from each other, for the purpose set forth.

In testimony whereof I hereto affix my signature in presence of two witnesses.

CHARLES K. STINSON.

Witnesses:
A. H. SPENCER,
CHARLES W. BASSETT.